United States Patent
Frobosilo et al.

Patent Number: 5,846,018
Date of Patent: Dec. 8, 1998

[54] DEFLECTION SLIDE CLIP

[75] Inventors: Raymond C. Frobosilo, Lido Beach; Ernest S. Viola, Huntington, both of N.Y.

[73] Assignee: Super Stud Building Products, Inc., Astoria, N.Y.

[21] Appl. No.: 933,726

[22] Filed: Sep. 23, 1997

Related U.S. Application Data

[63] Continuation of Ser. No. 703,222, Aug. 26, 1996, Pat. No. 5,720,571.

[51] Int. Cl.$^6$ .................................. E04H 9/02; F16B 9/00
[52] U.S. Cl. .............................. 403/403; 403/231; 403/2; 52/713; 52/98; 52/167.1
[58] Field of Search .................. 403/405.1, 406.1, 403/407.1, 403, DIG. 9, 231, 233, 234, 232; 52/713, 702, 98, 167.1; 248/300, 295.11; 411/504, 506, 507, 544

[56] References Cited

U.S. PATENT DOCUMENTS

| | | |
|---|---|---|
| 771,535 | 10/1904 | Coffin .................................. 403/231 X |
| 963,000 | 6/1910 | Deihl .................................. 248/295.11 |
| 1,400,007 | 12/1921 | Sparks ..................................... 248/300 |
| 1,691,784 | 11/1928 | Pietzsch et al. .................... 248/295.11 |
| 1,729,935 | 10/1929 | Froehlich . |
| 2,365,478 | 12/1944 | Grotta . |
| 3,561,792 | 2/1971 | Cycowicz ............................. 411/544 X |
| 3,715,850 | 2/1973 | Chambers ............................. 52/702 X |
| 4,073,107 | 2/1978 | Rousseau ........................... 52/167.1 X |
| 4,251,969 | 2/1981 | Bains . |
| 4,261,593 | 4/1981 | Yeager ............................... 248/300 X |
| 4,452,027 | 6/1984 | Desai . |
| 4,796,403 | 1/1989 | Fulton et al. . |
| 4,973,102 | 11/1990 | Bien ................................... 411/544 X |
| 5,009,557 | 4/1991 | Dessirier ................................. 411/504 |
| 5,720,571 | 2/1998 | Frobosilo et al. ...................... 403/403 |

FOREIGN PATENT DOCUMENTS

2828477 1/1980 Germany .................................. 403/3

*Primary Examiner*—Anthony Knight
*Attorney, Agent, or Firm*—Clifford G. Frayne

[57] ABSTRACT

Deflection slide clip of two piece construction for use in curtain wall construction providing for horizontal support of a laterally loaded stud while it accommodates vertical slip of the primary frame.

13 Claims, 10 Drawing Sheets

DEFLECTION SLIDE CLIP

CROSS REFERENCES TO APPLICATIONS

This is a continuation of application Ser. No. 08/703,222, filed Aug. 26, 1996, now U.S. Pat. No. 5,720,571.

This patent application is a continuation-in-part of Ser. No. 08/361,932 entitled "Deflection Slide Clip" filed on Dec. 22, 1994, by the same inventors.

BACKGROUND OF THE INVENTION

1. Field of the Invention

The present invention pertains to a deflection slide clip, and more particularly pertains to a deflection slide clip allowing for day-to-day vertical slip and for uneven floor or roof edge profile for the attachment of a laterally loaded curtain wall stud.

2. Description of the Prior Art

Traditional slide clips require the installation of continuous support angles which must be accurately installed to provide for a vertical plumb and aligned wall. At best this connection requires the installation of slotted adjustable angles which require field attachment after they are placed in final position. At worst the angle is attached out of position which requires the contractor to add short stud pieces to make the transition from stud to angle. Other clips do not provide the necessary offset required to accommodate the flange thickness of the stud and as a result, the clips are not installed flush to the surface of the support angle. As a result the welds or mechanical fasteners are required to "bridge" the resulting gap and consequentially, their holding values are not as predictable as those made when surface to surface contact is maintained.

The present invention provides a deflection slide clip which accommodates for irregularities of the primary frame along the horizontal and which also provides for a flush and direct mounting to the stud web.

SUMMARY OF THE INVENTION

The general purpose of the present invention is a deflection slide clip.

According to one embodiment of the present invention, there is provided a deflection slide clip including an angle member secured by a rivet and spring washer through a slotted hole in one leg of the angle member to a plate member. A plate member having a raised central planar member allows for rivet head clearance and allows for flush mounting of planar members flanking the raised central planar member to a stud member.

One significant aspect and feature of the present invention is a deflection slide clip which accommodates horizontal floor to stud misalignment.

Another significant aspect and feature of the present invention is an angled side clip member secured to a plate member by a slidable friction means having a spring washer to eliminate joint play.

A further significant aspect and feature of the present invention is offset construction of a plate member to flushly mount the plate member directly to the web of a stud.

An additional significant aspect and feature of the present invention is the manner in which the clip is attached to the web of the stud as any design stud with a web of 2½" and more can be utilized.

Still another significant aspect feature of the present invention is the incorporation of a single load carrying pivot rivet joining together the plate member and angle member of the angled slide clip.

An additional significant aspect and feature of the present invention is deformed stiffeners on an angled clip member to increase lateral load carrying capacities.

Still another significant aspect and feature of the present invention is prepunched holes to accommodate either screw or powder actuated fasteners to primary support elements.

Yet another significant aspect and feature of the present invention is the required load, both structure and wind is handled by a single rivet joining together the plate member and the angle member of the deflection slide clip.

Having thus described embodiments of the present invention, it is the principal object of the present invention to provide a deflection slide clip.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
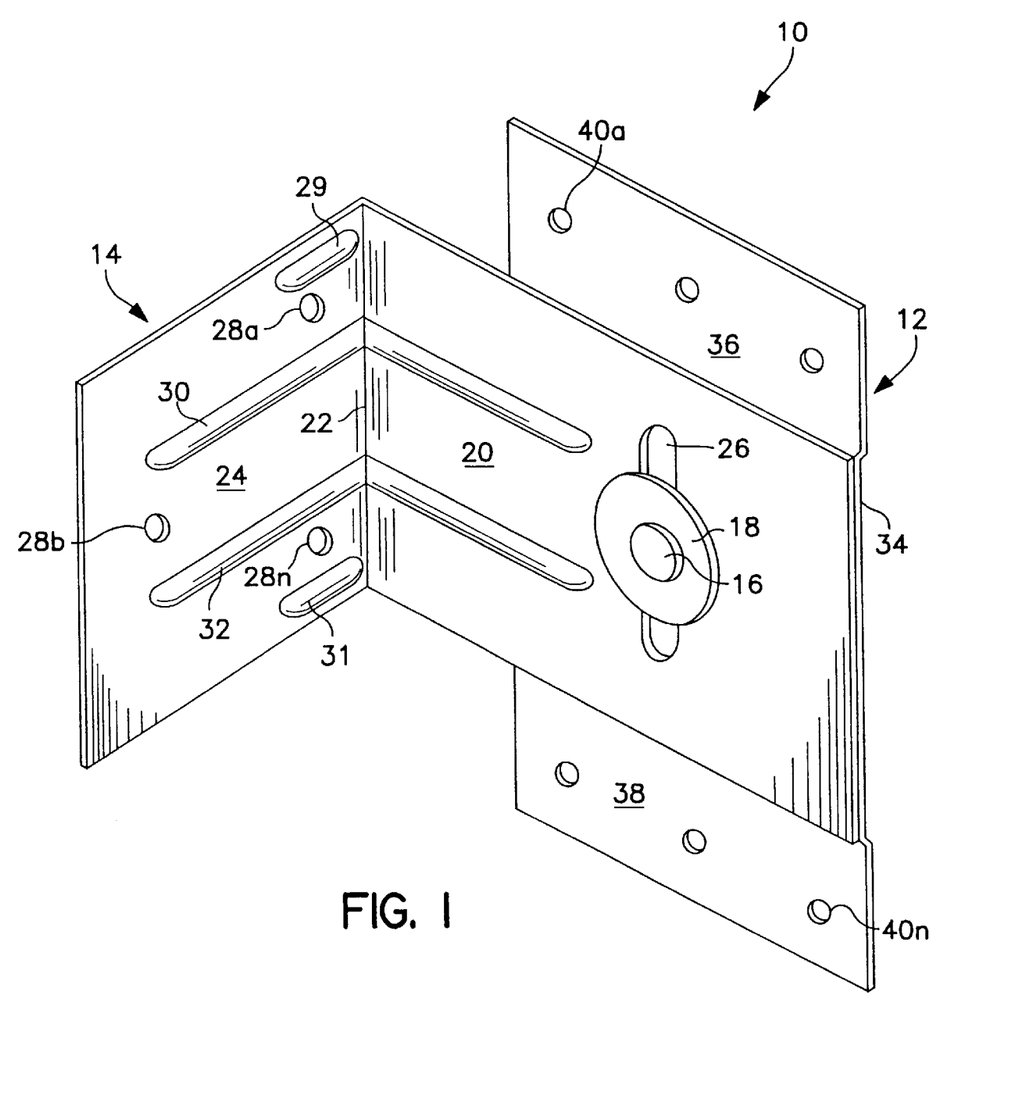
FIG. 1 illustrates a perspective view of a deflection slide clip.

FIG. 1 illustrates a perspective view of a deflection slide clip 10, herein referred to as the slide clip, including a configured plate member 12 and an angle member 14 each of heavy gauge metal construction, slidably and mutually secured by a large head rivet 16 and spring washer 18.

The angle member 14 includes a planar member 20 bent at and aligned at a right angle about bend axis 22 to a planar member 24. The planar member 20 includes a vertically aligned slotted hole 26 and planar member 24 includes a plurality of holes 28a–28n suitable for attachment by various hardware means known to the art. Deformed stiffeners 30 and 32 align horizontally along and between planar member 20 and 24 to increase its lateral load carrying capabilities. Deformed stiffeners 29 and 31 align horizontally along planar member 24 in close proximity to holes 28a and 28n for additional support in that region.

Figure 2:
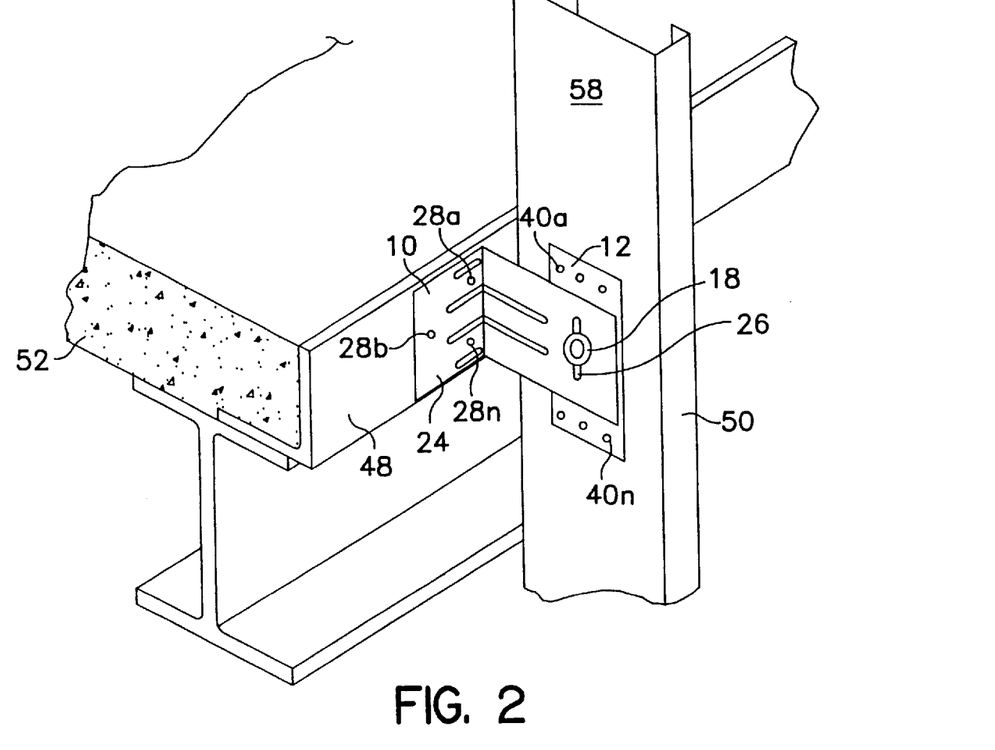
FIG. 2 illustrates a side view of the deflection slide clip.

The plate member 12 includes a central planar area 34 also illustrated in FIG. 2 and upper and lower planar areas 36 and 38 respectively offset from the planar area 34 as also illustrated in FIG. 2. A plurality of attachment holes 40a–40n align about the plate member 12.

FIG. 2 illustrates a side view of the slide clip 10, where all numerals correspond to those elements previously described. Illustrated in particular is the offset 42 between the rear surface of the central planar area 34 and the rear surfaces of the upper and lower planar areas 36 and 38. The offset 42 provides for flush attachment of the planar area members 36 and 38 without interference by the small rivet head 44 to the stud member which is supported. The rivet 16 aligns through and firmly against the spring washer 18, through the slotted hole 26, and through the central planar area 34 to provide tension and a nominal amount of friction between the plate member 12 and the angle member 14 while maintaining vertical slidability between the plate member 12 and the angle member 14.

Figure 3:
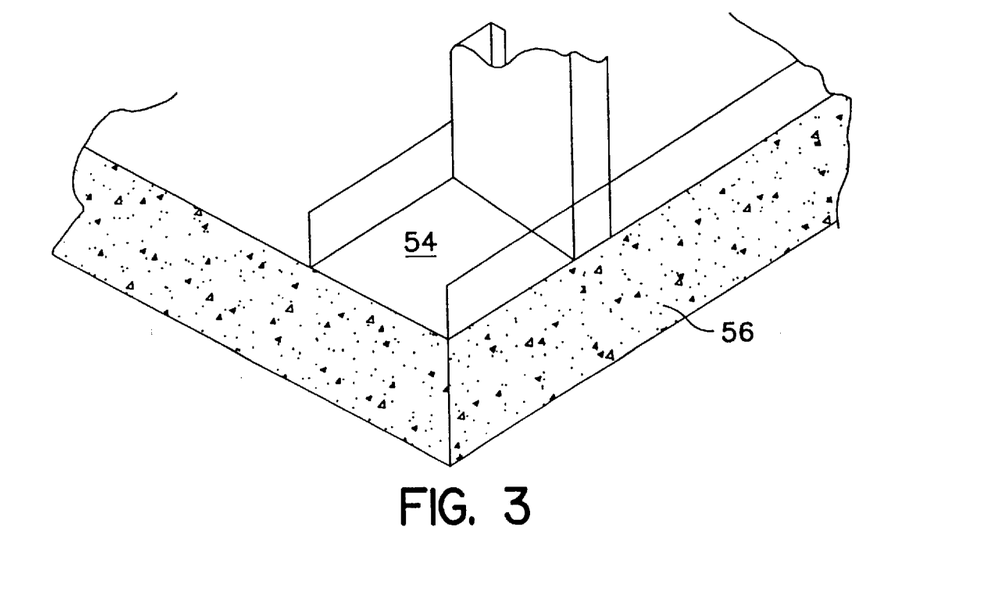
FIG. 3 illustrates a deflection slide clip securing a stud to an intermediate hot rolled steel angle attached to the primary frame.

FIG. 3 illustrates the slide clip 10 incorporated to position a steel stud 50 or in the alternative a wood stud, with reference to a continuous hot rolled steel angle member 48 located at an intermediate slab 52 and a track 54 mounted on a lower slab 56. Suitable fasteners align through holes 28a–28n of the planar member 24 to secure the slide clip 10 to the steel angle number 48 and suitable fasteners aligning with holes 40a–40n of the plate member 12 to secure the plate member 12 of the slide clip 10 to the steel stud 50. The plate member 12 can also be welded or otherwise suitably attached to a steel stud 50. Depending on the amount of misalignment of the edge of the steel angle member 48 to the vertical center line of the stud 50, the plate member 12 can be mounted at any horizontal position across the web 58 of the stud 50 up to a distance which will allow for a minimum of (4) screw attachments, (2) top and (2) bottom; of the plate member 12 to the web 58.

Figure 4:
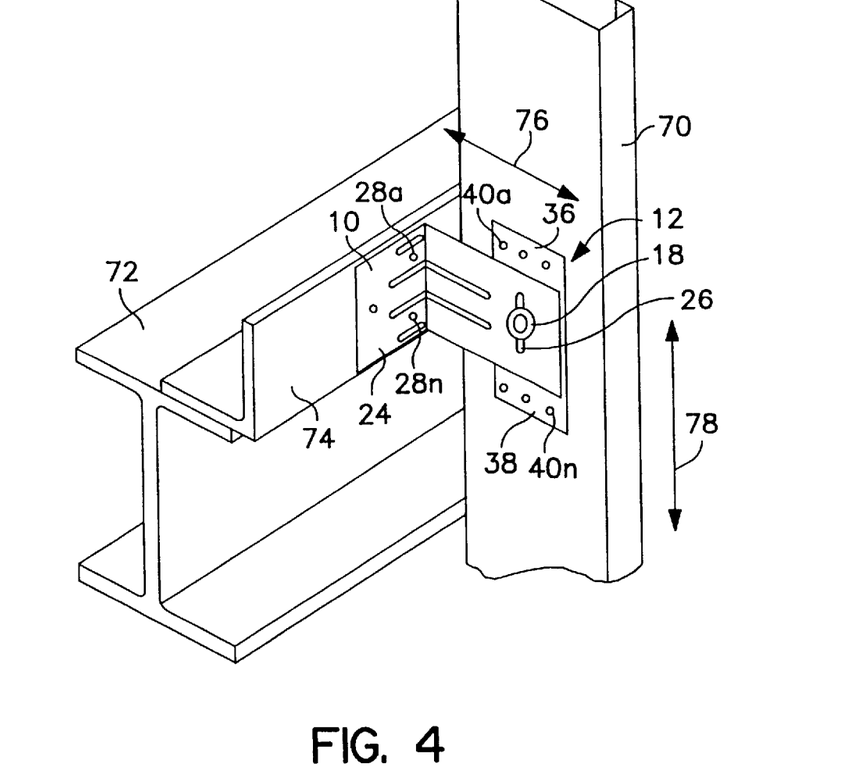
FIG. 4 illustrates a deflection slide clip securing a stud to a mid span I-beam and continuous support angle.

FIG. 4 illustrates a slide clip 10 incorporated to position a steel stud 70 with reference to a steel I-beam 72 with the use of an intermediate angle member 74, where all numerals correspond to those elements previously described.

The slide clip 10 can be used in various and different ways such as illustrated herein or incorporated using the basic members or modifications thereof to effect securation of a stud to an adjacent structural member. During installation, horizontal positioning of the steel stud 70 along arrow line 76 with respect to the intermediate angle member 74 is accomplished prior to the incorporation of fasteners through holes 40a–40n extending into the steel stud 70. Subsequent to securation vertical sliding accommodation between the steel stud 70 and the members to which it is attached, including the intermediate angle member 74 and I-beam 72, is provided by the slide clip 10 along arrow 78.

Figure 5:
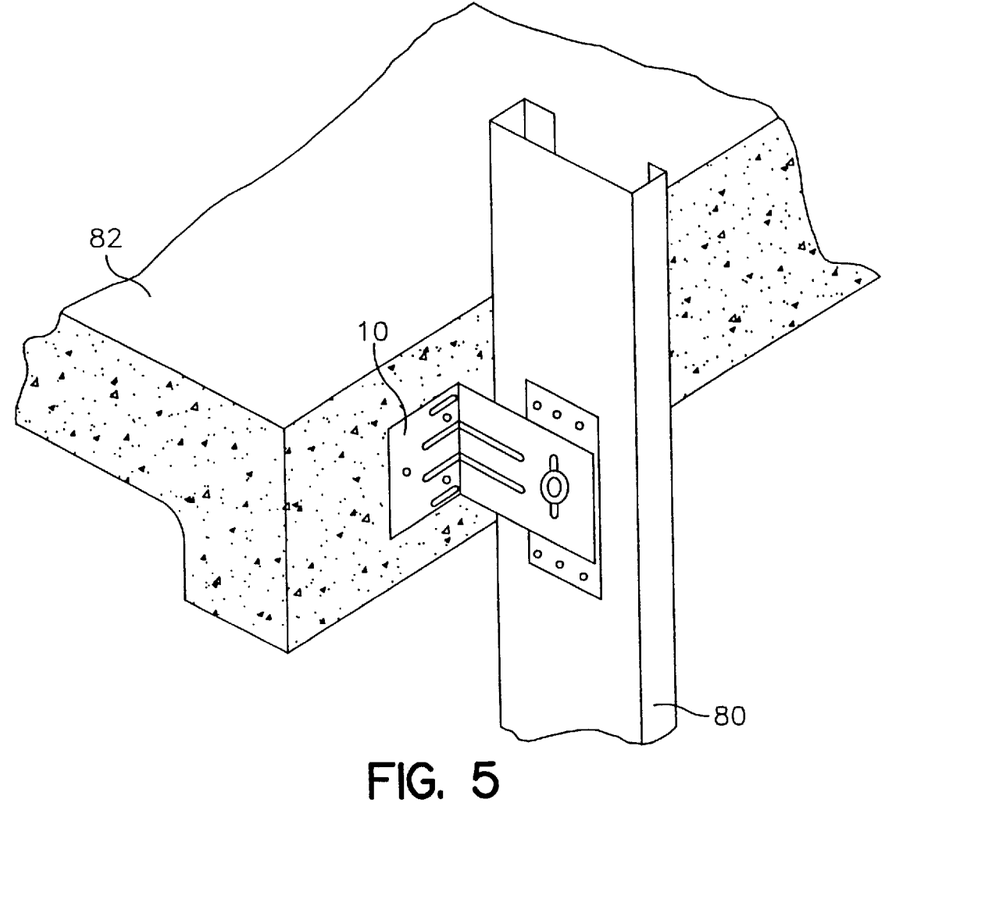
FIG. 5 illustrates a deflection slide clip securing a stud to a concrete slab edge.

FIG. 5 illustrates a steel stud 80 secured directly to a concrete slab 82 by a slide clip 10, where all numerals correspond to those elements previously described.

Figure 6:
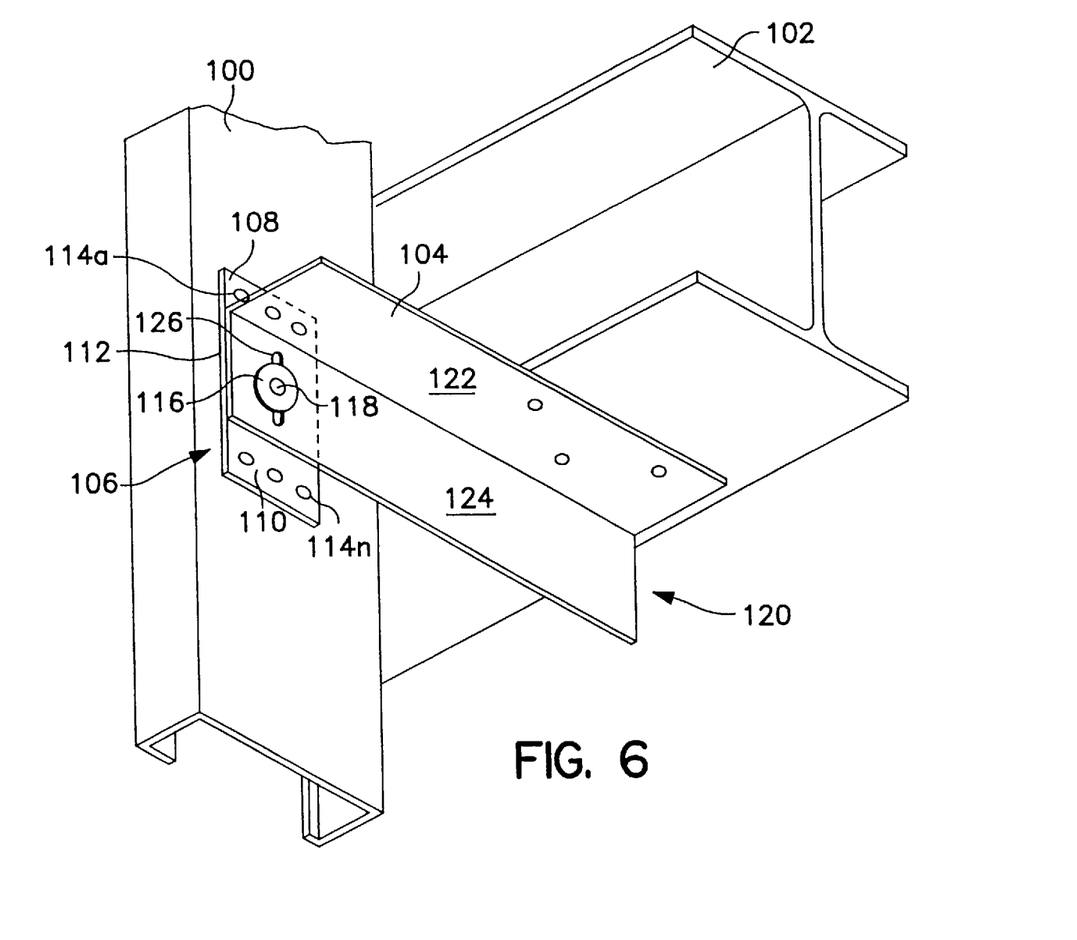
FIG. 6 illustrates a deflection slide strut assembly.

FIG. 6 illustrates a steel stud 100 secured to an I-beam 102 by a deflection slide strut assembly 104 incorporating the teachings of the deflection slide clip 10 previously described. The deflection slide strut assembly 104 includes a plate member 106 which is identical to plate member 12 as previously described including upper and lower planar areas 108 and 110, an integral offset member 112 between upper and lower planar members 108 and 110, a plurality of mounting holes 114a–114n, a spring washer 116, and a large head rivet 118. An angle member 120 includes a horizontal member 122 and a vertical member 124. Horizontal member 122 can be secured with suitable fasteners and thus the entire deflection slide strut assembly 104 secured to the I-beam 102. Securation can also be accomplished by alternate methods such as welding. A slotted hole 126 aligns vertically at one end of the vertical member 124. The angle member 120 slidingly secures to the plate member 106 by the large head rivet 118 and spring washer 116. Vertical sliding accommodation between the steel stud 100 and the I-beam 102 is provided by the slide clip 120.

Figure 7:
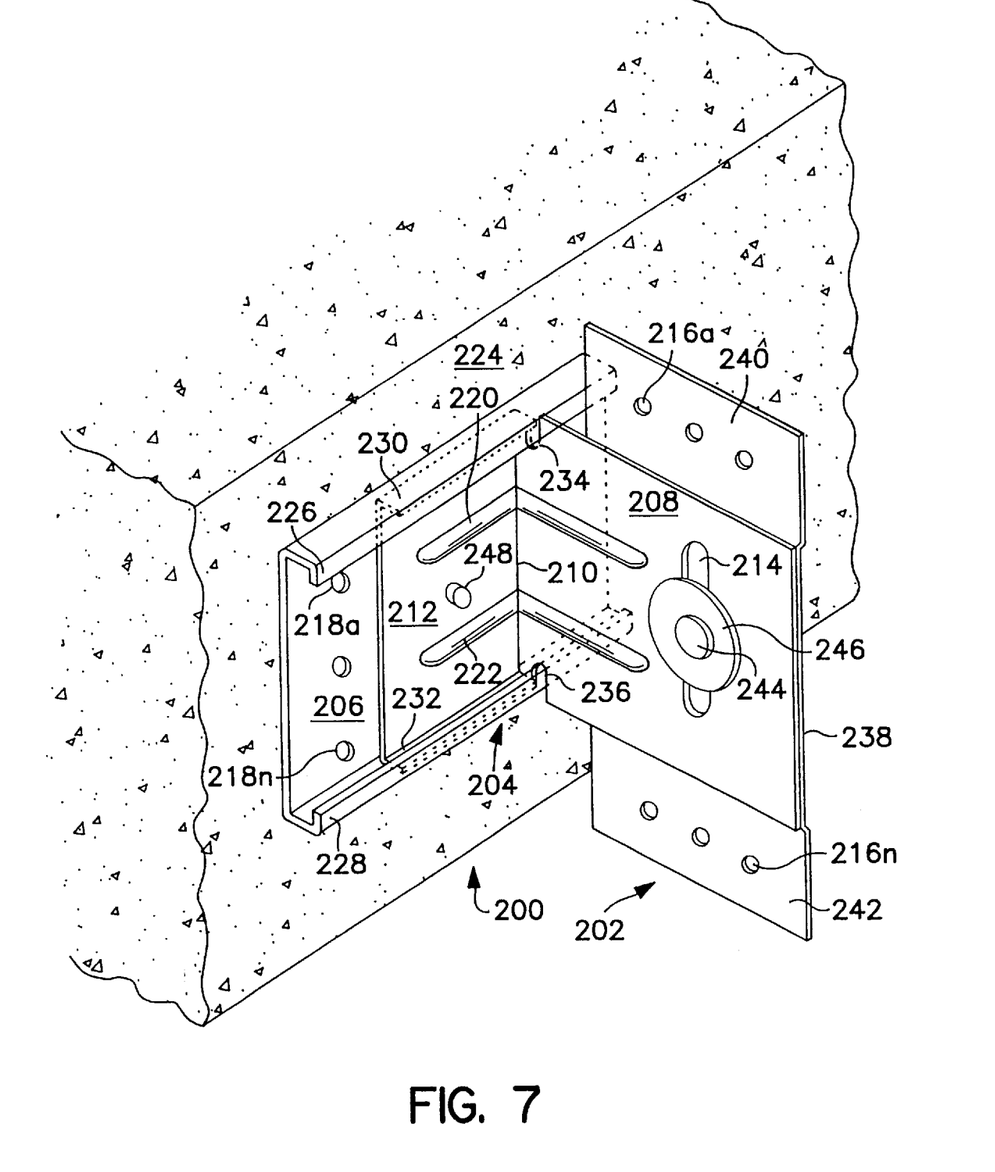
FIG. 7 illustrates a perspective view of a seismic deflection slide clip assembly, the first alternative embodiment.

FIG. 7 illustrates a perspective view of a seismic deflection slide clip assembly 200, herein referred to as the seismic slide clip, including a configured plate member 202, an angle member 204 and a base slide plate member 206. The angle member 204 is constructed similarly to the previously described angle member 14, with the addition of a 90 degree forward bend on the top 230 and the bottom 232 as shown in FIG. 7. Bends 230 and 232 also incorporate a slight design radius to prevent binding or chaffing during horizontal movement in the base slide plate member 206. The seismic slide clip 200 is a modification of the deflection slide clip 10 which accommodates horizontal movement of the primary structure with the addition of the base slide plate member 206. The base slide plate member 206 allows the deflection slide clip 10 to perform as initially specified as well as to accommodate any horizontal displacement of the primary frame.

The enhancements to the slide deflection clip which allow it to perform as part of the seismic deflection clip assembly, include the base slide plate member 206 which is a planar member with two 90° angles inwardly bent, the radius on each 90° bend is R=1½ for the outside radius and R=1 for the inside radius and on each of the top and bottom surfaces, creating lips 226 and 228. The lips 226 and 228 are designed with an inside radius specification R=1 and bend 230 and 232 are designed with an outside radius specification of R=1½. Therefore, there will be no point of contact in the corner. These lips 226 and 228 not only capture planar member 212 along bends 230 and 232 as shown in FIG. 7, but also serve as stiffeners and guide rails.

The angle member 204 includes a planar member 208 bent at and aligned at a right angle about bend axis 210 to a planar member 212. The planar member 208 includes a vertically aligned slotted hole 214 and also notches 234 and 236 to accommodate lips 226 and 228. Notches 234 and 236 allow uniform movement along base slide plate member 206, and reinforce lips 226 and 228 under loaded conditions. Plate member 202 includes a plurality of holes 216a–216n suitable for attachment by various hardware means known in the art. Base plate 206 also includes a plurality of holes 218a–218n for suitable attachment to a concrete slab 224 or any specified in the primary structure. Deformed stiffeners 220 and 222 align horizontally along and between planar member 208 and 212 to increase its lateral load carrying capabilities. A plastic pin 248 centers between deformed stiffeners 220 and 222 on planar member 212 as shown in FIG. 7, which positions and locks the angle member 204 to the base slide plate member 206 for installation of the seismic slide clip 200 to the primary frame. If horizontal movement occurs, the plastic pin 248 will shear and the angle member 204 will slide along the base slide plate member 206, compensating for the horizontal shift.

The plate member 202 includes a central planar area 238 also illustrated in FIG. 7 and upper and lower planar areas 240 and 242 respectively offset from the planar area 238 as also illustrated in FIG. 7. A plurality of attachment holes 216a–216n align about the plate member 202 for securing plate member 202 to a stud or other support beam. A large head rivet 244 and a spring washer 246 slidingly secure angle member 204 to plate member 202.

Figure 8:
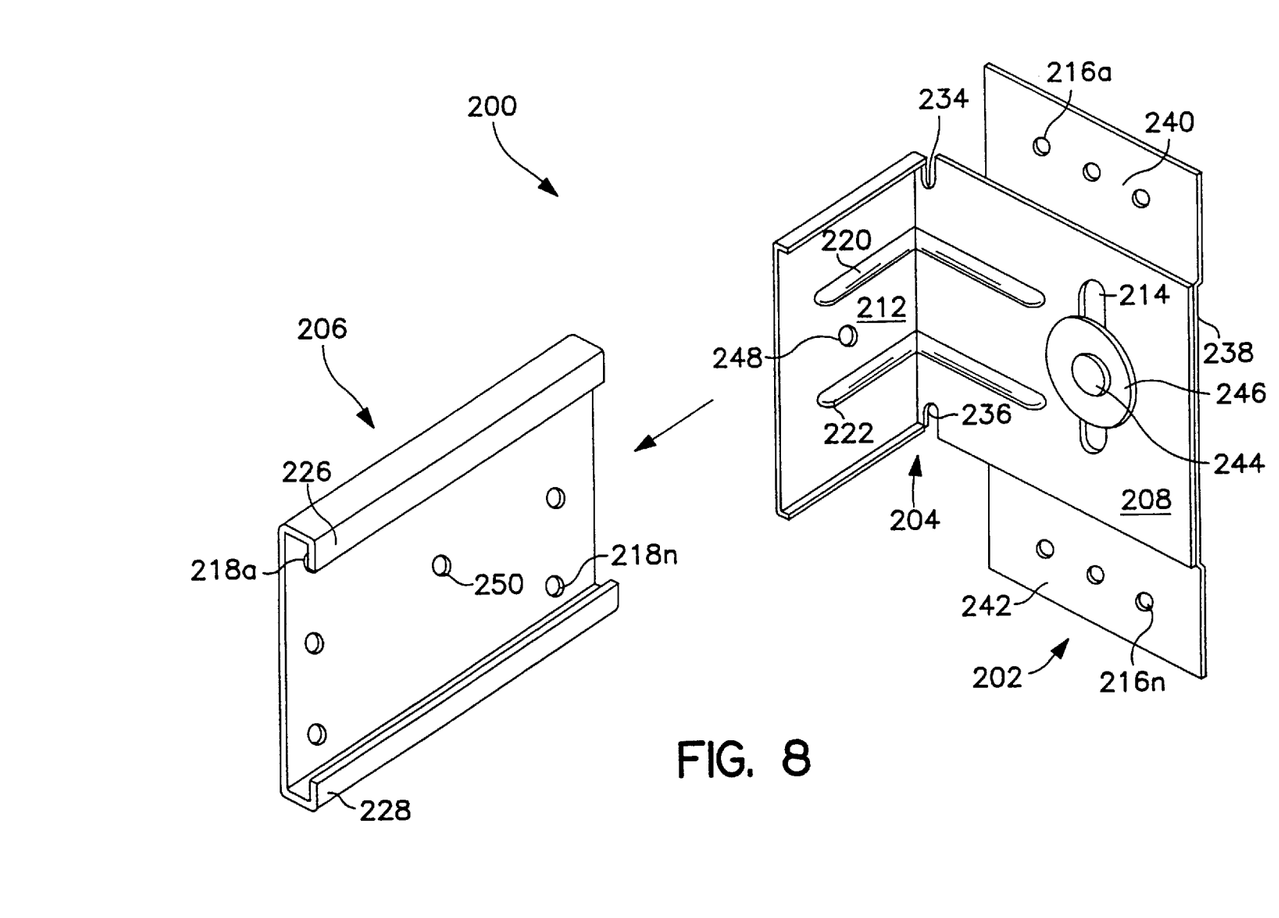
FIG. 8 illustrates an exploded view of the seismic deflection slide clip assembly.

FIG. 8 illustrates an exploded view of the seismic deflection slide clip assembly 200, where all numerals correspond to those elements previously described. Illustrated in detail in this figure are notches 234 and 236, lips 226 and 228 and a hole 250 in which plastic pin 248 engages and positionally locks angle member 204 to base slide plate member 206.

Figure 9:
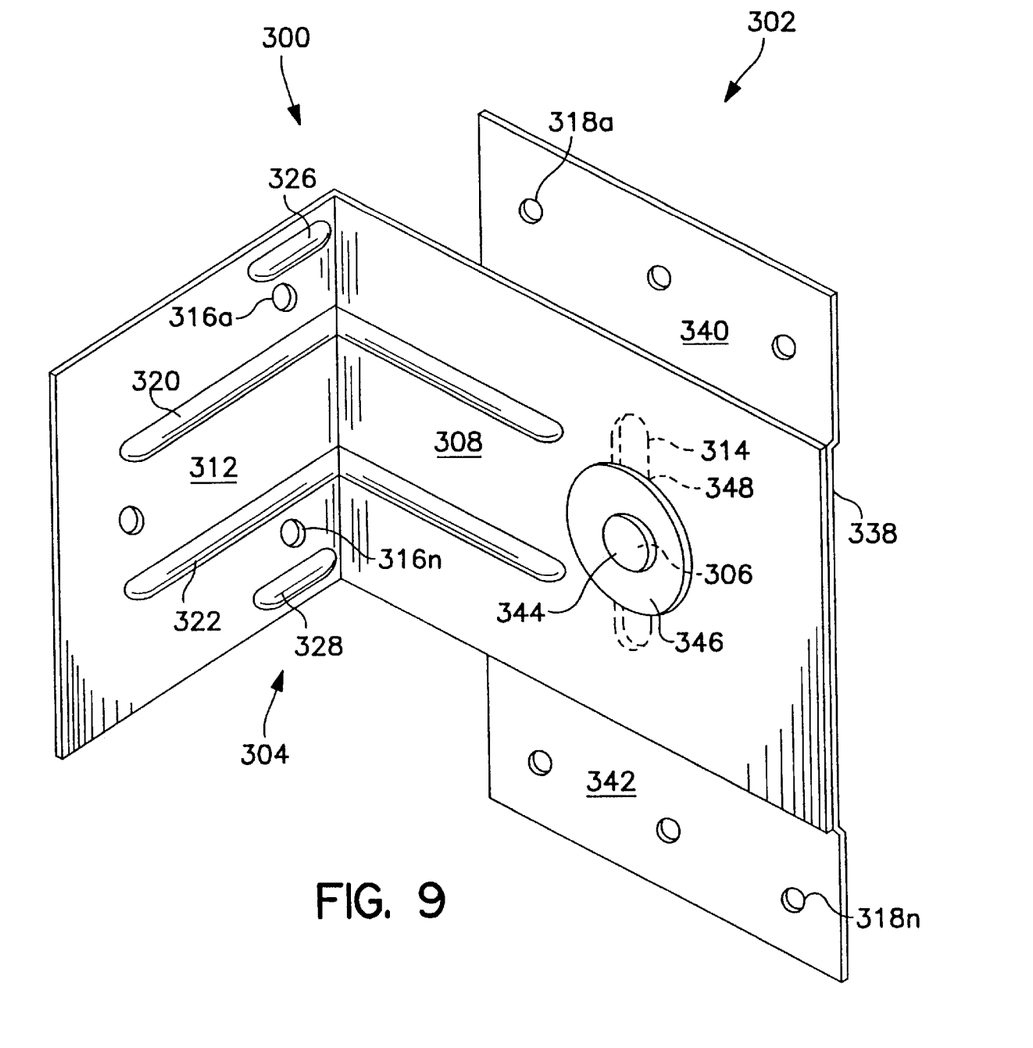
FIG. 9 illustrates a perspective view of an angle mount seismic deflection clip assembly, the second alternative embodiment.
Figure 11:
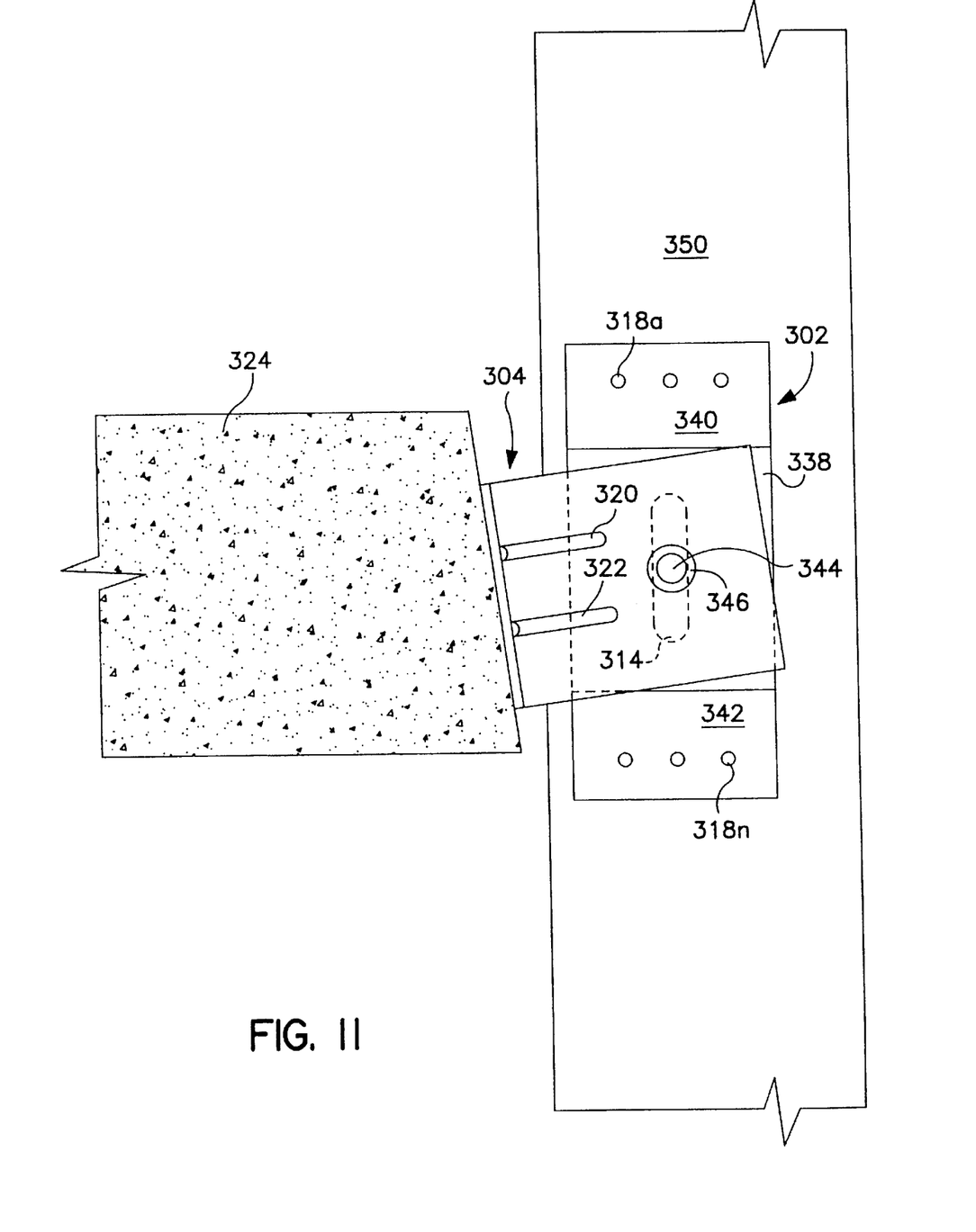

FIG. 9 illustrates a perspective view of an angle mount deflection clip assembly 300, herein referred to as angle mount clip, the second alternative embodiment, where all numerals correspond to those elements previously described. The angle mount clip 300 includes a configured plate member 302 and an angle member 304. The angle member 304 is constructed similarly to the previously described angle member 14, having planar members 308 and 312, a bend axis 310, a plurality of mounting holes 316a–316n and deformed stiffeners 320, 322, 326 and 328. The angle mount clip 300 is a modification of the deflection slide clip 10 which accommodates vertical movement of the primary structure with angled members as shown in FIG. 11.

The angle member 304 includes a planar member 308 bent at and aligned at a right angle about bend axis 310 to a planar member 312. The plate member 302 includes a vertically aligned slotted hole 314 and a plurality of holes 318a–318n suitable for attachment by various hardware means known in the art. Planar member 312 includes a plurality of holes 316a–316n for suitable attachment to a concrete slab 224 or any specified material in the primary structure. Deformed stiffeners 320 and 322 align horizontally along and between planar member 308 and 312 to increase its lateral load carrying capabilities.

The plate member 302 includes a central planar area 338 with a slotted hole 314 vertically aligned along the central planar area 338 and upper and lower planar areas 340 and 342 respectively offset from the planar area 338 as also illustrated in FIG. 9. A plurality of attachment holes 318a–318n align about the plate member 302 for securing plate member 302 to a stud or other support beam. A large head rivet 344 and spring washers 346 and 348 slidingly secure angle member 304 to plate member 302. Having the slotted hole 314 located on plate member 302 allows angle member 304 to be pivotally engaged between various angled concrete slabs or other suitable materials and the primary structure. The vertical alignment of slotted hole 314 also allows for the angle mount clip 300 to accommodate any vertical shift in the primary structure.

Figure 10:
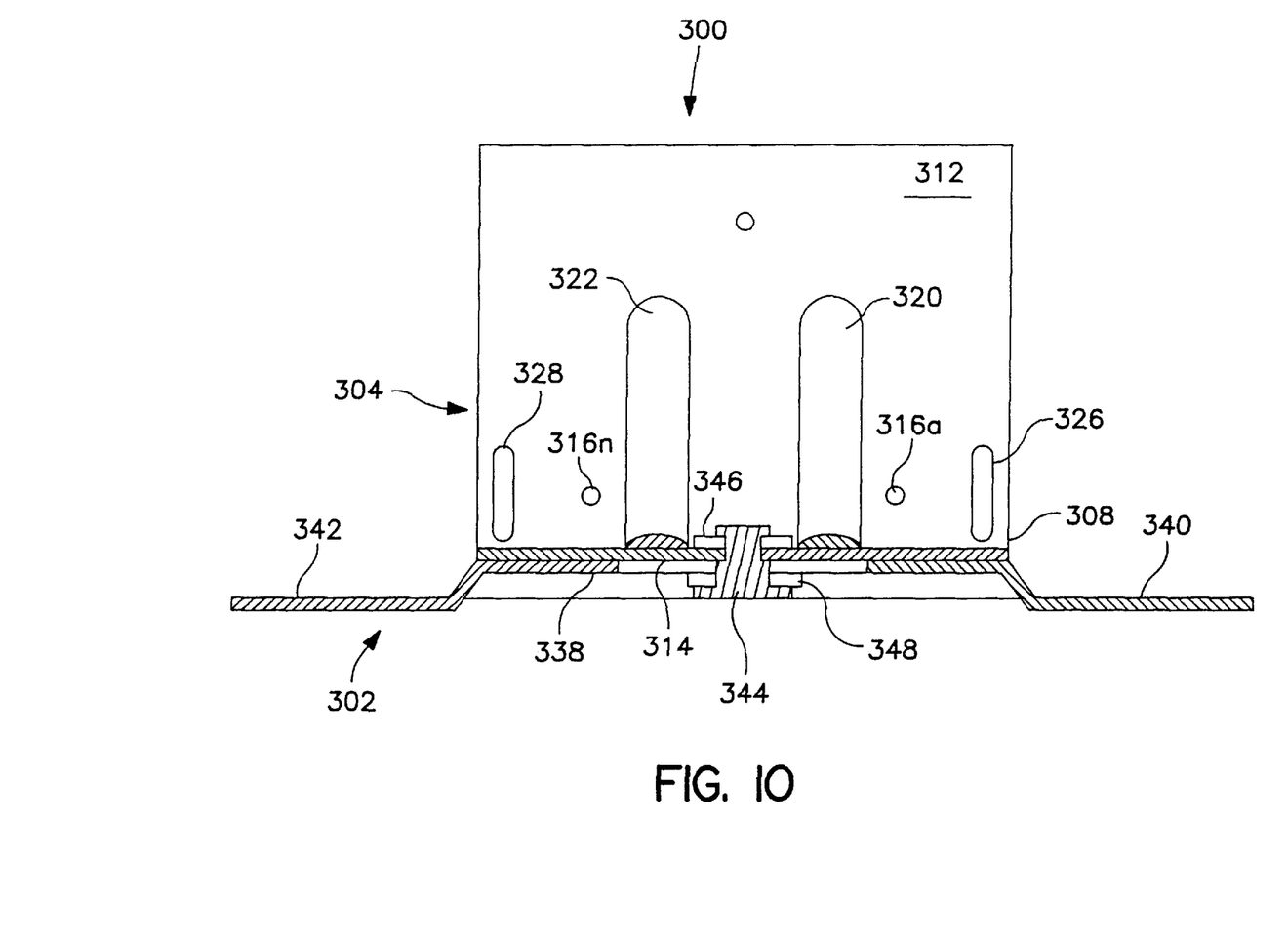
FIG. 10 illustrates an end view in partial cut-away of the angle mount seismic deflection clip assembly; and, FIG. 11 illustrates the angle mount seismic deflection clip assembly engaged between an I-beam and an angled concrete slab.

FIG. 10 illustrates an end view in partial cut-away of the angle mount deflection clip assembly 300, where all numerals correspond to those elements previously described. Illustrated in detail in this FIG. is the engagement of plate member 302 and angle member 304 via large head rivet 344 and spring washers 346 and 348 where planar member 308 lies juxtaposed to central planar member 338. Large head rivet 344 passes upwardly through spring washer 348, the slotted hole 314 in the central planar area 338 of plate member 302, hole 306 in planar member 308, spring washer 346 and sliding secures the assembly.

FIG. 11 illustrates the angle mount deflection clip assembly 300 engaged between a stud 350 and a non-vertical primary frame 324, where all numerals correspond to those elements previously described. The angle of the non-vertical primary frame 324 may vary because the pivot at large head rivet 344 accommodates change in angle of the building material.

Various modifications can be made to the present invention without departing from the apparent scope hereof.

| DEFLECTION SLIDE CLIP PARTS LIST | |
|---|---|
| 10 | deflection slide clip |
| 12 | plate member |
| 14 | angle member |
| 16 | large head rivet |
| 18 | spring washer |
| 20 | planar member |
| 22 | bend axis |
| 24 | planar member |
| 26 | slotted hole |
| 28a–n | holes |
| 29 | deformed stiffener |
| 30 | deformed stiffener |
| 31 | deformed stiffener |
| 32 | deformed stiffener |
| 34 | central planar area |
| 36 | upper planar area |
| 38 | lower planar area |
| 40a–n | holes |
| 42 | offset |
| 44 | small rivet head |
| 48 | angle member |
| 50 | steel stud |
| 52 | slab |
| 54 | track |
| 56 | slab |
| 58 | web |
| 70 | steel stud |
| 72 | I-Beam |
| 74 | angle member |
| 76 | arrow |
| 78 | arrow |
| 78 | arrow |
| 80 | steel stud |
| 82 | concrete slab |
| 100 | steel stud |
| 102 | I-beam |
| 104 | deflection slide strut assembly |
| 106 | plate member |
| 108 | upper planar member |
| 110 | lower planar member |
| 112 | offset member |
| 114a–n | mounting holes |
| 116 | spring washer |
| 118 | large head rivet |
| 120 | angle member |
| 122 | horizontal member |
| 124 | vertical member |
| 126 | slotted hole |
| 200 | seismic deflection slide clip assembly |
| 202 | plate member |
| 204 | angle member |
| 206 | base slide plate member |
| 208 | planar member |
| 210 | bend axis |
| 212 | planar member |
| 214 | slotted hole |
| 216a–n | holes |
| 218a–n | holes |
| 220 | deformed stiffener |
| 222 | deformed stiffener |
| 224 | concrete slab |
| 226 | lip |
| 228 | lip |
| 230 | bend |
| 232 | bend |
| 234 | notch |
| 236 | notch |
| 238 | central planar area |
| 240 | upper planar area |
| 242 | lower planar area |
| 244 | large head rivet |
| 246 | spring washer |
| 248 | plastic pin |
| 250 | hole |

DEFLECTION SLIDE CLIP PARTS LIST

| | |
|---|---|
| 300 | angle mount deflection clip assembly |
| 302 | plate member |
| 304 | angle member |
| 306 | hole |
| 308 | planar member |
| 310 | bend axis |
| 312 | planar member |
| 314 | slotted hole |
| 316a–n | holes |
| 318a–n | holes |
| 320 | deformed stiffener |
| 322 | deformed stiffener |
| 324 | non-vertical primary frame |
| 326 | deformed stiffener |
| 328 | deformed stiffener |
| 338 | central planar area |
| 340 | upper planar area |
| 342 | lower planar area |
| 344 | large head rivet |
| 346 | spring washer |
| 348 | spring washer |
| 350 | stud |

We claim:

1. A deflection slide clip comprising:
   a. a first planar member and a second planar member at substantially right angles, said first and second planar members having an inner surface and an outer surface said first planar member having a slotted vertical aperture therethrough, said second planar member having at least one securing aperture therethrough;
   b. in order, a large head rivet, spring washer, a flat washer, and a small head rivet all about a central shaft disposed in said slotted aperture, said large head rivet and said spring washer positioned against said interior surface of said first planar member;
   c. a first plate member affixed to said outer surface of said first planar member, said first plate member having at least one securing aperture therethrough for receipt of said central shaft and said small flat washer and said small rivethead; and
   d. a second plate member in slidable relationship with said second planar member, said second plate member having at least one securing aperture therethrough.

2. The clip of claim 1 including upper and lower planar area affixed to said first plate member.

3. The clip of claim 1 wherein said upper and lower planar areas of said first plate member are offset from said first plate member for rotation of said first plate member.

4. The clip of claim 1 including at least one deformed stiffener in said first and second planar members.

5. The clip of claim 1 including at least two deformed stiffeners in said first and second planar members.

6. The clip of claim 1 wherein said second plate member is C-shaped in cross-section formed of a main planar web, opposing planar sides extending perpendicular from said main plate or web in the same direction from said main planar web and parallel to each other and opposing lip members extending from said planar sides towards each other for the slidable receipt of said second planar member.

7. The clip of claim 6 wherein said second plate member has a securing means positioned thereon cooperative with said second planar member said securing means for positionally locking said second planar member from slidable relationship with said second plate member.

8. The clip of claim 7 wherein said securing means is a shear pin disengageable from a locking position upon action by seismic activity.

9. A deflection slide clip comprising:
   a first planar member and a second planar member at substantially right angles said first planar member having an aperture therethrough and said second planar member having at least one securing aperture therethrough;
   a plate member having a slotted vertical aperture positioned therethrough alignable with said aperture in said first planar member, said plate member having at least one securing aperture therethrough;
   in order, a large head rivet, a spring washer, a flat washer, a small head rivet disposed about a central shaft extendable through said aperture in said first planar member and said slotted aperture of said planar member, said small head rivet and said flat washer secured to said first planar member, said large head rivet and said spring washer secured to said plate member.

10. The clip of claim 8 including upper and lower planar areas affixed to said plate member.

11. The clip of claim 10 wherein said upper and lower planar areas of said plate member are offset from said plate member for rotation of said plate member.

12. The clip of claim 9 including at least one deformed stiffener in said first and second planar members.

13. The clip of claim 9 including at least two deformed stiffeners in said first and second planar members.

* * * * *